May 26, 1970 TSUTOMU NISHINO ET AL 3,514,725

COAXIAL TYPE HELICAL STRIP SLOW WAVE STRUCTURE

Filed Jan. 31, 1967 4 Sheets-Sheet 1

INVENTORS
TSUTOMU NISHINO
HARUO MAEDA

BY Stevens, Davis, Miller & Mosher
ATTORNEYS

INVENTORS
TSUTOMU NISHINO
HARUO MAEDA

BY Stevens, Davis, ...

ATTORNEYS

INVENTORS
TSUTOMU NISHINO
HARUO MAEDA
BY
ATTORNEYS

COAXIAL TYPE HELICAL STRIP SLOW WAVE STRUCTURE

Filed Jan. 31, 1967 4 Sheets-Sheet 4

INVENTORS
TSUTOMU NISHINO
HARUO MAEDA
BY Stevens, Davis, Miller & Mosher
ATTORNEYS

3,514,725
COAXIAL TYPE HELICAL STRIP SLOW WAVE STRUCTURE

Tsutomu Nishino, Yokohama, and Haruo Maeda, Tokyo, Japan, assignors to Matsushita Electric Industrial Co., Ltd., Osaka, Japan, a corporation of Japan Filed Jan. 31, 1967, Ser. No. 613,003
Claims priority, application Japan, Feb. 7, 1966, 41/7,561; Feb. 14, 1966, 41/9,496
Int. Cl. H03h 7/30, 7/38
U.S. Cl. 333—31 5 Claims

ABSTRACT OF THE DISCLOSURE

A coaxial type helical strip slow wave structure comprising a helical conductor and a cylindrical shielding outer conductor, wherein impedance matching at the signal input or output connection is realized from DC to 7000 mc. by inserting a contact pin into the center hole of said strip conductor, the insertion length being not more than one turn thereof and by reducing the outer diameter of that part of the strip conductor into which said pin is inserted or alternatively by connecting a coaxial resistor directly to the termination of said slow wave structure.

This invention relates to a coaxial type helical strip slow wave structure to be used in a traveling wave type cathode ray tube or for delaying an electromagnetic wave, and it is a main object of the invention to provide an efficiently matched connection between said helical strip slow wave structure and a signal input or output connector.

Other objects, features and advantages of the invention will become apparent from the following detailed description of the invention when taken in conjunction with the accompanying drawings, in which.

Figure 2:
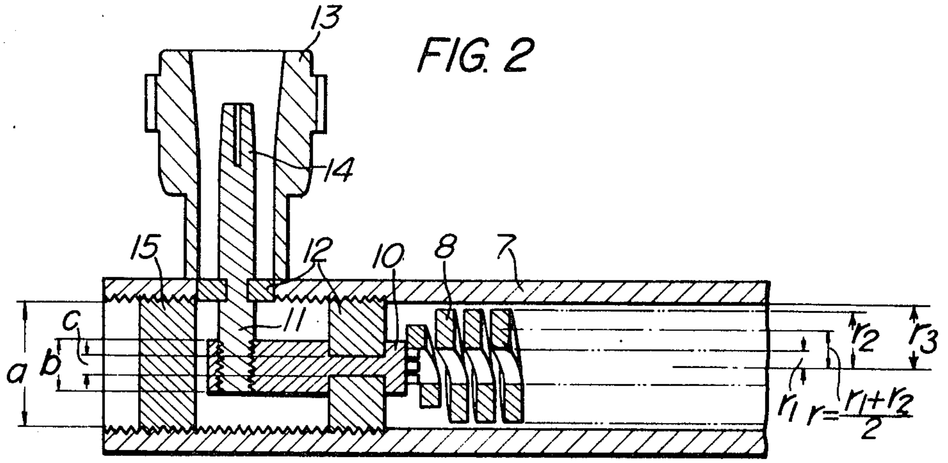
FIG. 2 is a sectional diagram of a coaxial type helical strip slow wave structure embodying the present invention.
Figure 3A:
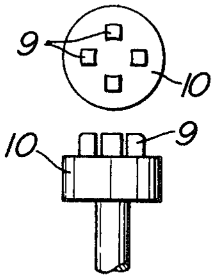
Figure 3B:
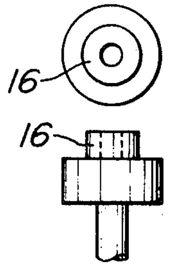
Figure 4:
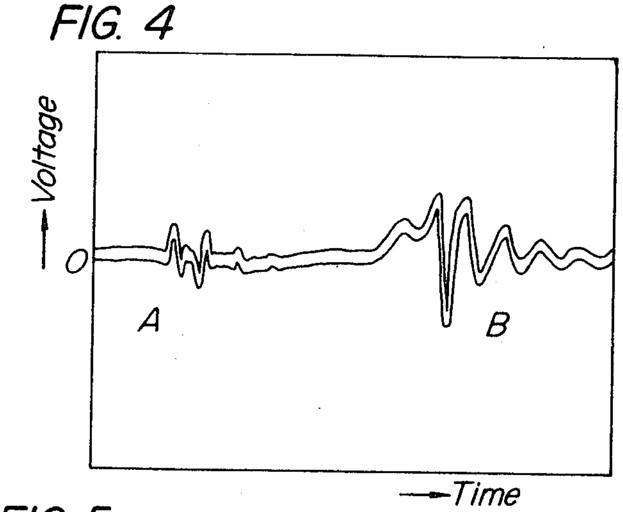
Figure 5A:
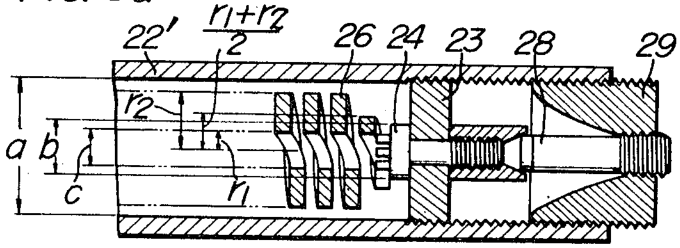
Figure 5B:
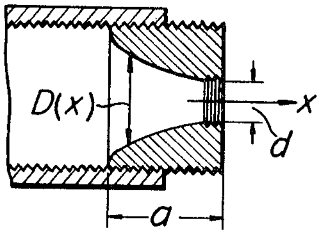
Figure 6:
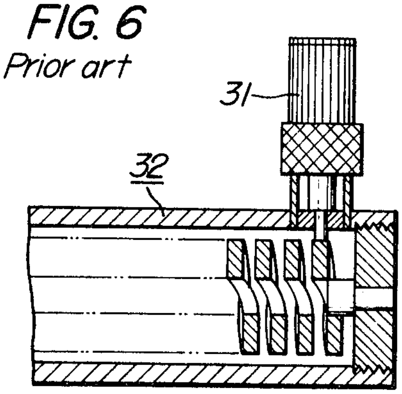
FIG. 6 Prior art
Figure 7A:
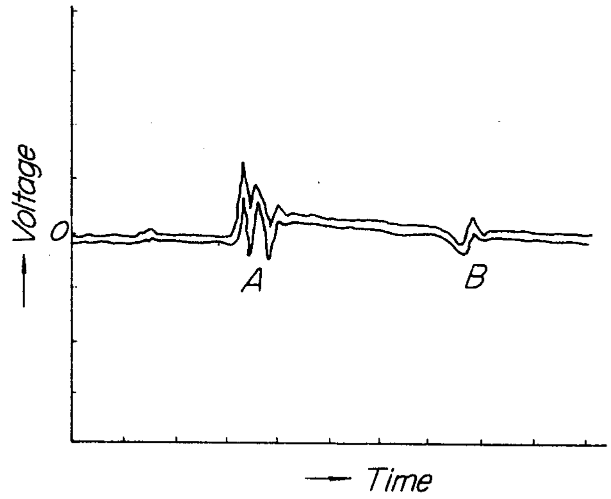
Figure 7B:
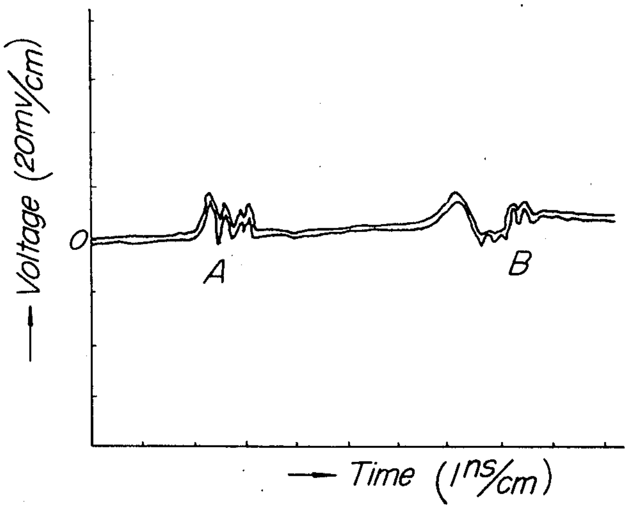
Figure 8:
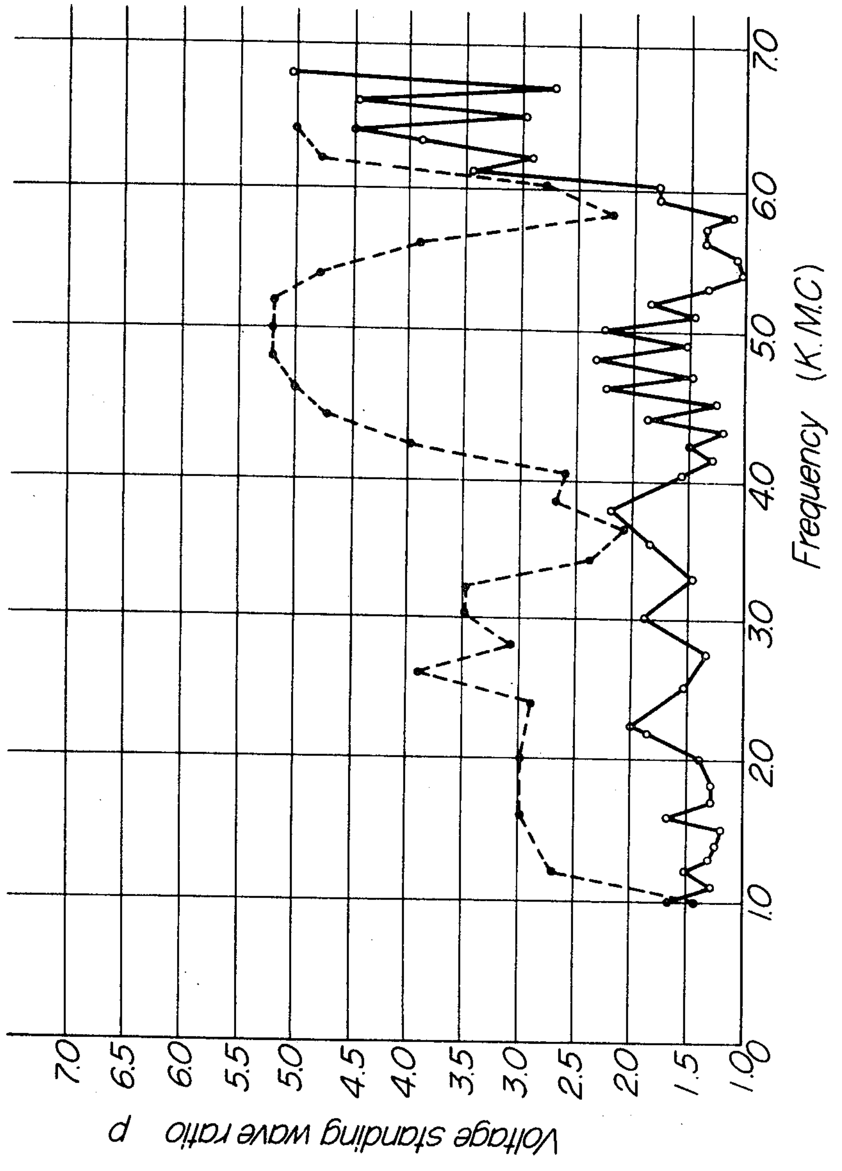

FIGS. 3*a* and 3*b* are exploded views of a contact pin used in the device shown in FIG. 2;

FIG. 4 is a diagram for the illustration of the reflective wave forms appearing in a known device and in a device according to the invention;

FIGS. 5*a* and 5*b* illustrate the broad band nonreflecting termination of another coaxial type helical strip slow wave structure embodying the invention;

FIG. 6 shows a conventional termination;

FIGS. 7*a* and 7*b* show oscillogram of the waveforms of the reflective waves coming from the matched termination according to the invention and from the matched termination according to prior art, respectively, when a fast unit step voltage having a rise time of 0.1 ns. is applied, said diagrams illustrating the extent to which the impedance matching between the slow wave structure and the termination is improved; and FIG. 8 shows voltage standing wave ratio vs. frequency characteristics measured at the input side.

Figure 1:
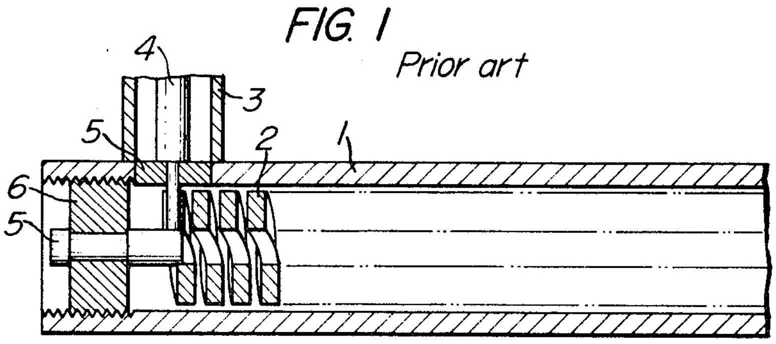
FIG. 1 Prior art
FIG. 1 is a sectional diagram of a known coaxial type helical strip slow wave structure.

Firstly, a conventional coaxial type helical strip slow wave structure will be explained with reference to FIG. 1. In the figure, reference numeral 1 designates a cylindrical shielding outer conductor, and inside of said cylindrical conductor 1 is provided a helical strip conductor 2. At the same time, a signal input and output coaxial connector 3 is provided at the end of said cylindrical shielding outer conductor 1 so that an inner conductor 4 of said connector may contact or may be screwed into the end part of said helical strip conductor 2 or any other position suitable for impedance matching, and thus said cylindrical outer conductor 1 is connected to the connector 3. Reference numeral 5 indicates a support member for the inner conductor 4 and 6 indicates an adjusting screw block.

In such a slow wave structure, an electromagnetic field distribution disturbance is inevitable due to the structure of the connection between the inner conductor 4 and the strip conductor 2 and accordingly, a local impedance variation appears at the connection between the inner conductor 4 and the strip conductor 2.

The state of said impedance variation, measured by time domain reflectometry, is shown at B in FIG. 4.

As seen from this figure, though an input signal is transmitted efficiently through the connection between the inner conductor 4 and the strip, conductor 2 up to DC–4000 mc. in the device described hereinabove, the reflection increases rapidly in the frequency range above the aforementioned frequency and thus a signal cannot be transmitted with a high efficiency. Accordingly, even if the transmission characteristic of the slow wave structure itself lies in the range DC–7000–8000 mc., it has been difficult to make full use of said characteristic.

The present invention is intended to obviate the deficiencies described hereinabove and an embodiment of the invention will be described hereinbelow with reference to FIGS. 2 and 3. Reference numeral 7 designates a cylindrical shielding outer conductor whose inner radius is represented by $r_2$ and a helical strip conductor 8 is provided in said cylindrical shielding outer conductor 7.

Then, a contact pin 10 is inserted into the final turn of said helical strip conductor 8. An L type inner conductor 11 including at the end part thereof a contact pin 10 comprising four protruding parts 9 as shown in FIG. 3*a* is supported with a support member 12 formed of dielectrics and is placed in the shielding outer conductor 7.

Reference numeral 13 indicates a signal input or output coaxial connector and an inner conductor 14 of this connector 13 is connected to said L type inner conductor 11. Reference numeral 15 indicates an adjusting screw block.

The values of $a$ and $b$ shown in FIG. 2 are selected so that the characteristic impedance may become 50Ω, i.e. they may satisfy $$50(\Omega)=\frac{138}{\sqrt{\epsilon}}\log_{10}\frac{a}{b}$$

where $\epsilon$ is the dielectric constant of the dielectrics. Accordingly, that part of the L type inner conductor 11 which is supported with the dielectric support member 12 is so designed that the diameter $c$ of the inner conductor 11 may be small in inverse proportionality to $\sqrt{\epsilon}$ of the dielectrics.

Further, in order to avoid impedance mismatching at the connection between the helical end part of the strip conductor 8 and the L type inner conductor 11 as much as possible and thereby to provide good matching, the end of the L type inner conductor 11 is inserted into the center hole of the helical strip conductor 8. In this case if the inserting part 9 of the contact pin 10 is columnar and fills the center hole in a way that it contacts several turns of the helical conductor, said part constitutes a coaxial helical groove line and exhibits an extremely low characteristic impedance. In order to prevent said impedance drop, the length of the inserting part 9 positioned at the end of the contact pin 10 is selected so that it may contact at most one turn of the strip conductor 8 and further, in order to reduce the capacitance introduced by the inserted inner conductor and thereby to provide impedance matching, four protruding parts 9 are arranged in a form of a circular arc whose size is adjusted to the center hole of the helical strip conductor as shown in FIG. 3*a*, and having a width of 1.5 mm. and a thickness of about 1.5 mm. are inserted into the center hole and fixed thereto so that the end surfaces of the contact pin may contact the end surfaces of the helical strip conductor 8.

Further, since inductance per turn is lowered by the insertion of the four protruding parts, the outer diameter of the contact turn of the strip conductor 8 is reduced to $r_1+r_2$ to obtain matching of the characteristic impedance at the contact point, where $r_1$ and $r_2$ represent the radius of the center hole of the helical strip conductor 8 and the radius of the outer edge of an ordinary turn of the strip conductor 8, respectively. Otherwise, as shown in FIG. 3*b*, the center hole part 16 for the insertion into the strip conductor 8 is made of steatite 16 to achieve impedance matching at the inserted part and contact is made by bonding the end surfaces with the application of pressure.

Accordingly, as is seen from the reflective wave form shown at A in FIG. 4, the variation of the associated lumped impedance at the connection between the L type inner conductor 11 and the strip conductor 8 is made as small as possible and thus a uniform signal transmission from the outer coaxial line (connector) to a coaxial type helical strip slow wave structure is made feasible in the frequency range up to DC–7000 mc. B in FIG. 4 shows a reflective wave form observed in a conventional device.

As is fully described above, the present invention is such that a contact pin providing at the end thereof with a plurality of protruding parts of a circular ring form or a contact pin formed of a cylindrical dielectric is inserted into the center hole of a helical strip conductor in such a way that the contact pin contacts at most one turn of the helical strip conductor, and that the outer diameter of that part of the strip conductor into which the contact pin is inserted is smaller than the rest of the strip. Therefore, the invention is an epoch making one because the variation of the associated lumped impedance at the connection point between the helical strip conductor and the inner conductor of the connector can be made as small as possible and the uniform signal reception and transmission from the external coaxial line to the coaxial type helical strip slow wave structure is made feasible over a broad frequency band.

Now, another embodiment of the invention applied to termination will be described hereinbelow.

In a conventional helical strip deflecting line used in a traveling wave type cathode ray tube, an output connector is usually terminated by a dummy load to absorb the signal completely. However, such a device has the following disadvantages. Namely, as the operating frequency band of a traveling wave type broad band cathode ray tube of this type is extended to a higher frequency range, the associated lumped impedance at the connection of the signal input and output coaxial connector becomes remarkably effective due to the structural mismatching at said connection, and in a frequency range above 4000 mc., a resonance occurs with the input and output parts as a nodal point and the voltage standing wave ratio becomes over six periodically to impair the deflecting characteristics.

Accordingly, even if the frequency band of the deflecting slow wave structure itself lies in the range DC–7 to 8 gc., the operating frequency band is likely to be limited by the resonance phenomena at the input and output coaxial connectors. According to the present invention, said defect can be eliminated, the operating frequency band can be extended to a very high frequency range and thus broad band matching with the voltage standing wave ratio below 2.5 can be achieved over the frequency range up to at least DC–6 gc. Accordingly, it has become possible to make a broad band cathode ray tube. Since, as is described above, one of the largest impedance mismatches, producing the main part of the reflective wave, appears at the connection point between the helical strip and the inner conductor of the output coaxial connector for connecting outside the tube a coaxial nonreflecting terminating resistor. Said connection is abandoned according to the present method and instead a terminating resistor is connected to the end of the helical strip through a coaxial line connected by a broad band nonreflected terminating method.

Now, the embodiment of the invention will be described in more detail. Said embodiment (FIG. 5*a*) is so designed that an electromagnetic wave may be transformed into a propagation of TEM mode along a coaxial line while making the disturbance of the propagation of the electromagnetic wave along the coaxial type helical strip line as small as possible. In other words, the coaxial transmission system is composed of an extended part of a cylindrical outer conductor 22' of a helical strip slow wave structure and an inner conductor of a contact pin 24, and the characteristic impedance thereof is made to be 50Ω.

At the termination of said coaxial line, a broad band cylindrical dummy made of a high frequency carbon resistor 28 is mounted on the inner conductor of the coaxial line to form a broad band nonreflecting termination. Said resistor 28 should be such a resistor that its characteristics do not change in a baking or other tube manufacturing process in a vacuum.

In order to improve the characteristics of said broad band nonreflecting termination, a tapered compensator 29 is placed around the carbon resistor and connected to the cylindrical outer conductor of the slow wave structure. The form of the taper of the tapered compensator 29 is given by, $$\ln \frac{D(x)}{d} = 2\pi\sqrt{\frac{\epsilon}{\mu}}\,R\left(1-\frac{x}{a}\right) \quad (1)$$

$$k=\omega^2\epsilon\mu=\frac{2\pi}{\lambda}=\text{propagation constant}$$

where, as shown in FIG. 5*b*, $D(x)$=inner diameter at a point $x$
$d$=outer diameter of an inner resistor
$a$=length of the inner resistor
R=resistance of 50Ω resistor
$\omega=2\pi f$=angular frequency of the electromagnetic wave
$\lambda$=wave length
$\mu$=susceptibility
$\epsilon$=dielectric constant According to this novel method, the reflective wave B at the termination, shown in FIG. 7*a*, is improved relative to the conventional example B in FIG. 7*b* since the impedance mismatching can be reduced to less than ½ and as shown in FIG. 8, uniform matching with the voltage standing wave ratio less than 2.5 can be achieved over the frequency range up to DC–6 gc. In FIG. 8, the solid line shows a case with the device according to the invention and the dotted line shows a case with a conventional device. When the present method is applied to a practical broad band cathode ray tube, good operating characteristics of electron beam deflection can be obtained up to DC–6 gc. Thus, the invention is an epoch-making invention.

What is claimed is:

1. A coaxial type helical strip slow wave structure comprising a helical strip conductor having a predetermined radial thickness and rigidity, both end portions of said helical strip conductor having a reduced outer diameter, and contact pins of signal input and output coaxial lines inserted in tightly engaged relation into said end portions, said contact pins being inserted into at most only one turn of said helical strip conductor to form a uniform connection therewith, whereby said helical strip conductor is supported at said both end portions and impedance mismatching occurring between said helical strip conductor and said input and output coaxial lines is prevented.

2. A coaxial type helical strip slow wave structure according to claim 1, in which each said contact pin has a plurality of protruding parts arranged in an annular ring form.

3. A coaxial type helical strip slow wave structure according to claim 1, in which each said contact pin has a protruding part formed by a cylindrical dielectric body.

4. A coaxial type helical strip slow wave structure according to claim 1, further comprising a coaxial type nonreflective terminating resistance assembly having a cylindrical resistor whose diameter is substantially equal to that of an inner conductor forming said output coaxial line and a tapered compensator having at its open end the same diameter as the inner diameter of an outer conductor enclosing the helical strip, said resistance assembly being aligned with the output side of the slow wave structure, said resistor being connected coaxially to said contact pin, and said open end of the compensator being concentrically fitted to the inside of said outer conductor.

5. A coaxial type helical strip slow wave structure according to claim 4, in which said structure is enclosed in a vacuum tube.

References Cited

UNITED STATES PATENTS

| | | | |
|---|---|---|---|
| 2,806,975 | 9/1957 | Johnson. | |
| 2,840,752 | 6/1958 | Cutler et al. | |
| 3,275,774 | 9/1966 | Miller | 336—192 |

HERMAN KARL SAALBACH, Primary Examiner

T. J. VEZEAU, Assistant Examiner

U.S. Cl. X.R.

333—34,81